United States Patent [19]
Yamazaki et al.

[11] Patent Number: 5,474,629
[45] Date of Patent: Dec. 12, 1995

[54] METHOD FOR MANUFACTURING A LIQUID CRYSTAL DEVICE

[75] Inventors: Shunpei Yamazaki, Tokyo; Akira Mase, Aichi; Toshiji Hamatani, Kanagawa, all of Japan

[73] Assignee: Semiconductor Energy Laboratory Co., Ltd., Kanagawa, Japan

[21] Appl. No.: 803,224

[22] Filed: Dec. 6, 1991

[30] Foreign Application Priority Data

Dec. 15, 1990 [JP] Japan .................. 2-417700
Dec. 15, 1990 [JP] Japan .................. 2-417701
Dec. 15, 1990 [JP] Japan .................. 2-417702

[51] Int. Cl.$^6$ .................................. B32B 31/00
[52] U.S. Cl. .................. 156/99; 156/275.5; 156/275.7; 156/273.9; 156/292; 156/298; 156/300
[58] Field of Search .................. 156/272.2, 275.5, 156/273.9, 275.7, 99, 292, 298, 300

[56] References Cited

U.S. PATENT DOCUMENTS

| | | | |
|---|---|---|---|
| 4,222,635 | 9/1980 | Jülke | 156/360 |
| 4,276,110 | 6/1981 | Bilhorn | 156/298 |
| 4,688,900 | 8/1987 | Doane et al. | |
| 4,705,360 | 11/1987 | Funada et al. | |
| 4,728,309 | 3/1988 | Baeger | 156/292 |
| 4,749,833 | 6/1988 | Novorsky et al. | 219/10.43 |
| 4,865,672 | 9/1989 | Delbeck et al. | 156/292 X |
| 4,994,204 | 2/1991 | Doane et al. | |
| 5,079,572 | 1/1992 | Shimodaira | 156/300 |
| 5,296,063 | 3/1994 | Yamamura | 156/275.5 |

Primary Examiner—Chester T. Barry
Attorney, Agent, or Firm—Sixbey, Friedman, Leedom & Ferguson; Gerald J. Ferguson, Jr.; Donald R. Studebaker

[57] ABSTRACT

A method for manufacturing a liquid crystal device, particularly a dispersion-type liquid crystal electrooptical device, which comprises a pair of substrates having incorporated therebetween a light-control layer comprising a transparent solid and a liquid crystal material and spacers, said substrates having provided thereon electrode layers and at least one of the substrates being transparent, is disclosed. The method comprises:

coating the electrode layer side of one of the substrates with a material which gives the light-control layer; and, laminating and fixing the pair of substrates to give a predetermined layered structure.

The spacers are uniformly disposed between the substrates by dispersing spacers on one of the electrode layers or on the light-control layer or applying a mixture comprising spacers, a liquid crystal material and a material for providing a transparent solid on one of the electrode layers.

The process is economical and enables large-sealed liquid crystal electrooptical devices which can provide uniform displays, at an extremely few steps comprising coating once the substrate with a material for the light-control layer.

24 Claims, 4 Drawing Sheets

METHOD FOR MANUFACTURING A LIQUID CRYSTAL DEVICE

BACKGROUND OF THE INVENTION

1. Field of the Invention

The present invention relates to a method for manufacturing a liquid crystal device which can be readily scaled up to give a large area. The liquid crystal device according to the present invention is useful as a screen for shielding visual field of windows and show windows, as a light-control curtain, and as a liquid crystal display which displays and electrically converts characters, figures, symbols, and the like.

2. Description of the Prior Art

Liquid crystal display devices heretofore used widely in practice include those using nematic liquid crystals, i.e., the TN (twisted nematic) mode or the STN (super-twisted nematic) mode liquid crystals. There has also been proposed recently a liquid crystal electrooptical device using a ferro-electric liquid crystal. However, it is requisite for the devices mentioned hereinbefore to use a polarizer sheet and to impart a regular orientation to the molecules along one direction. On the other hand, there is also known a dispersion type liquid crystal device which realizes high contrast without using any polarizer sheets nor applying such an orientation treatment to the molecules. This dispersion type liquid crystal device comprises a transparent solid polymer having dispersed therein nematic, cholesteric, or smectic liquid crystals in granules or in sponges. The method for fabricating such a liquid crystal device comprises dispersing liquid crystals in a polymer by encapsulating the liquid crystal, and then applying the resulting polymer as a thin film on a substrate or a film. The substances proposed to use in the encapsulation include gelatin, gum arabic, polyvinyl alcohol, and the like.

According to the encapsulating technique set forth above, the liquid crystal molecules having encapsulated in polyvinyl alcohol arrange themselves along the electric field when an electric field is applied, provided that the molecules have a positive dielectric anisotropy in the thin film. In such a case, the thin film turns transparent if the refractive index of the liquid crystal is equal to that of the polymer. When no electric field is applied, the liquid crystal molecules are in random orientation. Thus, the thin film turns opaque since the light cannot be transmitted due to scattering. In addition to the one exemplified above, some more liquid crystal devices comprising a thin film or a film of a polymer having dispersed therein encapsulated liquid crystals are also known. For example, there is known a liquid crystal display device comprising an epoxy resin matrix having dispersed therein liquid crystal materials, a liquid crystal display device which utilizes phase separation between a liquid crystal and a photocurable substance, and a liquid crystal display device which comprises a three-dimensional polymer structure being impregnated with a liquid crystal. Those liquid crystal electrooptical devices described above are collectively referred to hereinafter as dispersion type liquid crystal devices.

To realize a practically feasible large-scale liquid crystal electrooptical device as mentioned earlier, it is particularly required to develop an economical and a simplified technique for fabricating large devices.

In scaling up the liquid crystal device, several problems should be overcome. Since the transparent solid substance to be used in the dispersion type liquid crystals are highly viscous, the commonly used technique of liquid crystal injection does not apply. Accordingly, the liquid crystal should be once fabricated into a thin film on one side of the substrate by methods such as coating and casting, and then it should be fixed by superposing the other substrate on the thin film of the liquid crystal.

Furthermore, it is required in a large-area display that the spacers are uniformly distributed between a pair of substrates to maintain a constant distance between the substrates. However, in the dispersion-type liquid crystals, the fabrication process inevitably involves a method such as coating and casting, and, such a process causes segregation or partial aggregation of the spacers to hinder uniform dispersion thereof. Thus, the liquid crystal electrooptical devices realized heretofore suffered uneven spacing between the substrates.

SUMMARY OF THE INVENTION

An object of the present invention is to overcome the problems mentioned above and to provide a more economical process which realizes more easily a large-scale liquid crystal device, particularly a large-scale dispersion type liquid crystal device.

This and other objects of the present invention have been attained by a method for manufacturing a liquid crystal device which comprises a pair of substrates having incorporated therebetween a light-control layer comprising a transparent solid and a liquid crystal material, said substrates having provided thereon electrode layers and at least one of the substrates being transparent, wherein, the method comprises: coating the electrode layer side of one of the substrates with a material which gives the light-control layer, said material having mixed with spacers; and, laminating and fixing the pair of substrates to give a predetermined layered structure, thereby fixing the spacer on the substrate in a uniformly distributed arrangement and establishing a light-control layer between the pair of substrates. Thus can be realized a liquid crystal device having a uniform spacing between the substrates. The material which gives the light-control layer is prepared by mixing a liquid crystal material with a material for providing a transparent solid without dissolving them in a solvent.

According to another embodiment of the present invention, there is also provided a method for manufacturing a liquid crystal device which comprises a pair of substrates having incorporated therebetween a light-control layer comprising a transparent solid and a liquid crystal material, said substrates having provided thereon electrode layers and at least one of the substrates being transparent, wherein, the method comprises: distributing spacers on the electrode layer side of one of the substrates; fixing the thus distributed spacers on the electrode layer side of said substrate; forming a light-control layer on the electrode layer side of said one of the substrates after fixing the spacers; and, laminating and fixing the pair of substrates to give a predetermined layered structure, thereby fixing the spacer on the substrate in a uniformly distributed arrangement and establishing a light-control layer between the pair of substrates. Thus can be also realized a liquid crystal device having a uniform spacing between the substrates. The formation of the light-control layer is carried out by mixing a liquid crystal material with a material for providing a transparent solid without dissolving them in a solvent and subsequently applying the mixture on the electrode layer side of said one of the substrates.

In a still other embodiment according to the present invention, there is also provided a method for manufacturing a liquid crystal device which comprises a pair of substrates having incorporated therebetween a light-control layer comprising a transparent solid and a liquid crystal material, said substrates having provided thereon electrode layers and at least one of the substrates being transparent, wherein, the method comprises: distributing spacers on the electrode layer side of one of the substrates; forming a light-control layer on the electrode layer side of the other substrate; and, laminating and fixing the pair of substrates to give a predetermined layered structure, thereby fixing the spacer on the substrate in a uniformly distributed arrangement and establishing a light-control layer between the pair of substrates. Thus can be also realized a liquid crystal device having a uniform spacing between the substrates. The formation of the light-control layer is carried out by mixing a liquid crystal material with a material for providing a transparent solid without dissolving them in a solvent and subsequently applying the mixture on the electrode layer side of the other substrate.

The fixing of the pair of the substrates is carried out by light irradiation, heating, or combination thereof.

The material for providing a transparent solid comprises monomers to become a transparent solid polymer. Alternatively, the material for providing a transparent solid comprises a transparent solid substance (a transparent polymer in solid phase) selected from the group consisting of polyethylene, polymethacrylate, polystyrene, polyvinyl chloride, polyacrylonitrile, polyvinyl alcohol, polyester, polyamide resin, polyethylene terephthalate, fluoroplastics, silicone resin, and combination thereof.

In the case where the monomers to become a transparent solid polymer is used as the material for providing a transparent solid, the mixture of the monomers and the liquid crystal material is applied on a substrate and subsequently subjected to heating or light irradiation (the monomers are changed into a polymer thereby) to complete a light-control layer in the form of a transparent solid having dispersed therein nematic, cholesteric, or smectic liquid crystals either in granules or in sponges. In the case where the transparent solid substance (the transparent polymer in solid phase) is used as the material for providing a transparent solid, the transparent polymer in solid phase and the liquid crystal material are dissolved in a solvent and the solution is applied on a substrate and subsequently the solvent is removed to complete a light-control layer in the form of a transparent solid having dispersed therein nematic, cholesteric, or smectic liquid crystals either in granules or in sponges.

The solvent to be used includes, for example, unsaturated hydrocarbons such as ketones, alcohols, benzene, and toluene, as well as water. The solvents are used either alone or as a mixture of two or more thereof, properly selected depending to the method used for applying (coating).

The method of applying (coating) depends on the shape and the properties of the liquid crystal material, and is selected from among doctor knife method, roll coater method, curtain coater method, knife coater method, spray coating, spin coating, screen printing, offset printing, and the like.

DETAILED DESCRIPTION OF THE PRESENT INVENTION

The present invention is described in further detail below referring to non-limiting examples.

EXAMPLE 1

Figure 1A:
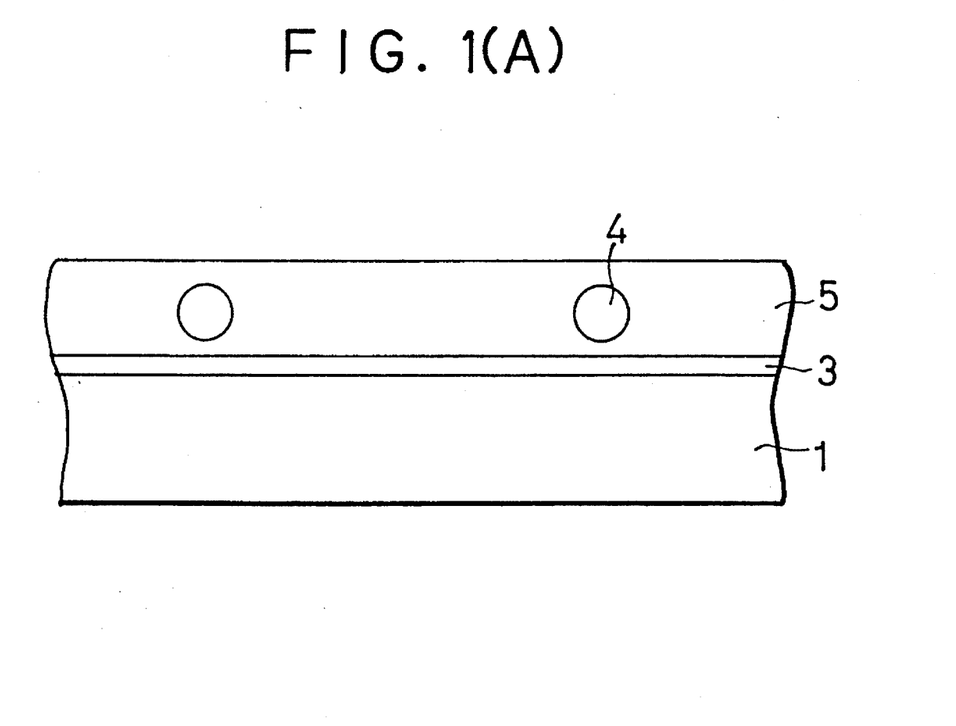
FIGS. 1(A) to 1(B) are cross sectional views illustrating a fabrication process of a liquid crystal electrooptical device according to an embodiment of the present invention.
Figure 1B:
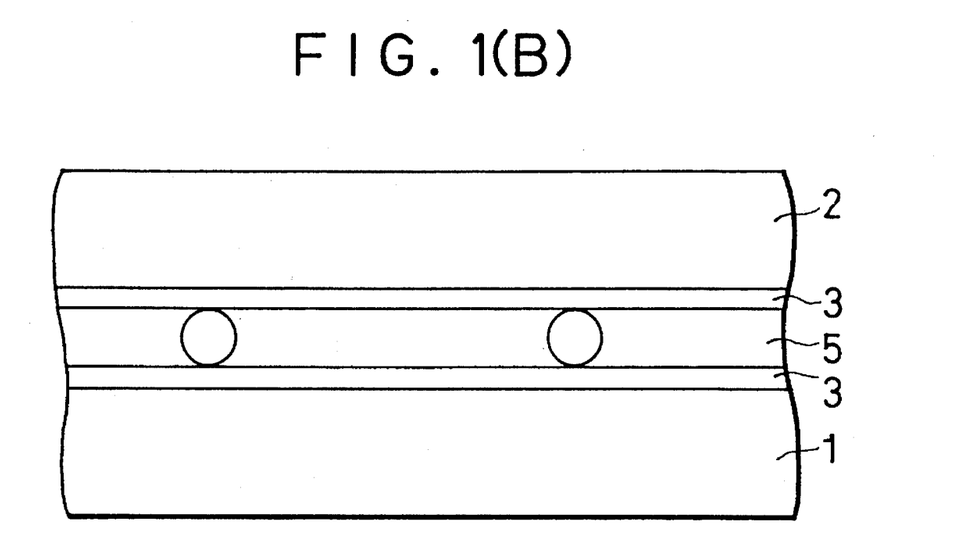

Referring to FIGS. 1(A) to 1(B), a process of fabricating a liquid crystal electrooptical device according to a first embodiment of the present invention is described below. The substrate used herein comprises a commonly used soda-lime glass plate 1 having provided thereon a 2000 Å thick ITO (Indium Tin Oxide) transparent electrode 3 in a predetermined pattern. The electrode side surface of the substrate was coated, using a spin coater, with a mixed aqueous solution comprising a nematic liquid crystal and polyvinyl alcohol having added therein spacers 4 (10.5 μm in average diameter), and was then subjected to heat treatment at 120° C. for 20 minutes to obtain a structure as shown in FIG. 1(A), having a light-control layer 5 (about 10 to 12 μm in thickness). The other substrate 2 was superposed on the substrate 1 at a predetermined position, and the whole was further heated at 120° C. for 30 minutes while pressing under a pressure of from 1 to 5 kg/cm² to fix the pair of substrates 1 and 2. Thus was completed a liquid crystal electrooptical device as shown in FIG. 1(B).

The resulting device comprised substrates at a uniform spacing, such as to give a distance between the substrates of 10.2 μm with a deviation within ±0.1 μm from this value, over substrates having an area of 200 mm×260 mm. Furthermore, the spacers were uniformly dispersed without causing segregation during the spin coating process at the fabrication of the light-control layer.

Alternatively, the substrates may be laminated, if necessary, in vacuum or under a reduced pressure. In such a case, the step of removing the solvent after the spin coating step may be omitted. Still more, the spacers which were fixed to the substrate in the present example not necessarily be fixed, and arranging them by dispersion is sufficiently effective.

EXAMPLE 2

Referring again to FIGS. 1(A) to 1(B), a process for fabricating a liquid crystal electrooptical device according to a second embodiment of the present invention is described below. The substrate used herein comprises a commonly used soda-lime glass plate 1 having provided thereon a 2000 Å thick ITO transparent electrode 3 in a predetermined pattern. The electrode side surface of the substrate was coated, by screen printing, with a homogeneously mixed solution comprising a nematic liquid crystal and a pre-polymer, e.g. monomers, having added therein spacers 4 (10.5 μm in average diameter) to a thickness of about 15 μm.

A homogeneous solution was prepared by mixing trimethylolpropane-triacrylate, which is used as the pre-polymer herein, with a commonly known nematic liquid crystal material, together with a polymerization initiator at an addition of about 25% with respect to the liquid crystal material. After applying the resulting homogeneous solution to one of the substrates, the other substrate 2 was superposed thereon at a predetermined arrangement, and the resulting laminate was pressed under a pressure of from 1 to 5 kg/cm² to adjust the distance between the substrates to about 10 μm, and to drive out the homogeneous solution having incorporated in excess. The solution driven out from the substrates was wiped off, and to the whole area of the resulting structure was irradiated a ultraviolet (UV) radiation to cure (polymerize) the pre-polymer maintained between the substrates to thereby fix the substrates 1 and 2. The irradiation was carried out for a duration of about 5 minutes to the laminated substrates using a 100 W/cm UV lamp set at a distance of about 20 cm from the substrates. The light-control layer 5 comprising a transparent solid and a liquid crystal was established and the substrates were then fixed, to thereby obtain a liquid crystal electrooptical device as shown in FIG. 1(B).

The resulting device comprised substrates having each an area of 200 mm×260 mm at a uniform spacing therebetween, such as to give a distance between the substrates of 10.0 μm with a deviation within ±0.1 μm from this value over the whole area of the substrates. Furthermore, the spacers were properly dispersed without causing segregation during the screen printing process at the fabrication of the light-control layer.

The process described in this Example is advantageous for fabricating a large-area device, since no step of removing the solvent is required after coating the light-control layer. Further effective is to apply a heat treatment to the resulting structure during the polymerization of the monomers or in the subsequent step thereto, to thereby increase the adhesion strength.

EXAMPLE 3

Referring again to FIGS. 1(A) to 1(B), a process for fabricating a liquid crystal electrooptical device according to a third embodiment of the present invention is described below. The substrate used herein comprises a commonly used soda-lime glass plate 1 having provided thereon a 2000 Å thick ITO transparent electrode 3 in a predetermined pattern. The electrode side surface of the substrate was coated, by screen printing, with a homogeneously mixed solution comprising a nematic liquid crystal and a prepolymer, e.g. monomer, having added therein spacers 4 (10.5 μm in average diameter) to a thickness of about 15 μm. A homogeneous solution was prepared by mixing trimethylol-propane-triacrylate, which is used as the pre-polymer herein, with a commonly known nematic liquid crystal material, together with a polymerization initiator at an addition of about 25% with respect to the liquid crystal material. After applying the resulting homogeneous solution to one of the substrates, the other substrate 2 was superposed thereon at a predetermined arrangement, and the resulting laminate was pressed under a pressure of from 1 to 5 kg/cm² to adjust the distance between the substrates to about 10 μm, and to drive out the homogeneous solution having incorporated in excess. After masking the portions other than portions of the substrates overlapping each other to avoid light irradiation thereto, a UV radiation was irradiated to the substrate to cure (polymerize) the pre-polymer maintained between the substrates to thereby establish a light-control layer while fixing the pair of substrates. The irradiation was carried out for a duration of about 5 minutes to the laminated substrates using a 100 W/cm UV lamp set at a distance of about 20 cm from the substrates. Then, the peripheral portions which remained un-irradiated with UV light were cleaned by removing the homogeneously mixed solution which had been driven out from the substrates using an organic solvent, to thereby fix the pair of substrates and finish it into a liquid crystal electrooptical device as shown in FIG. 1(B).

Since the contact lead portion of the substrates can be cleaned at the same time with the removal of the excess amount of the homogeneously mixed solution which had been driven out from the substrates, a favorable connection with a driving electric circuit for the liquid crystal could be established in the subsequent step. Thus, a higher reliability of the device could be achieved.

EXAMPLE 4

Figure 2A:
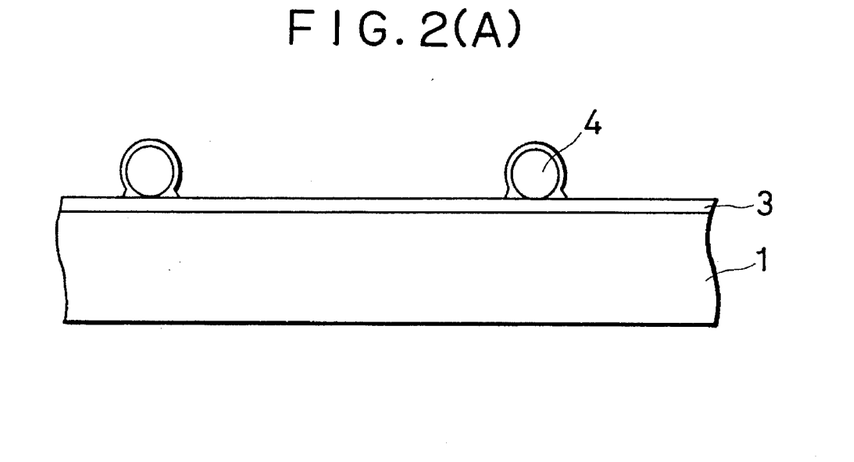
FIGS. 2(A) to 2(C) are cross sectional views illustrating a fabrication process of a liquid crystal electrooptical device according to an embodiment of the present invention.
Figure 2B:
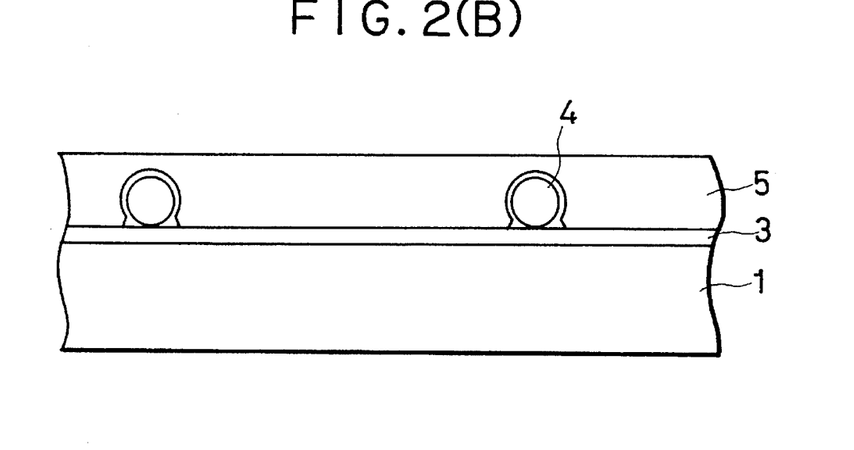
Figure 2C:
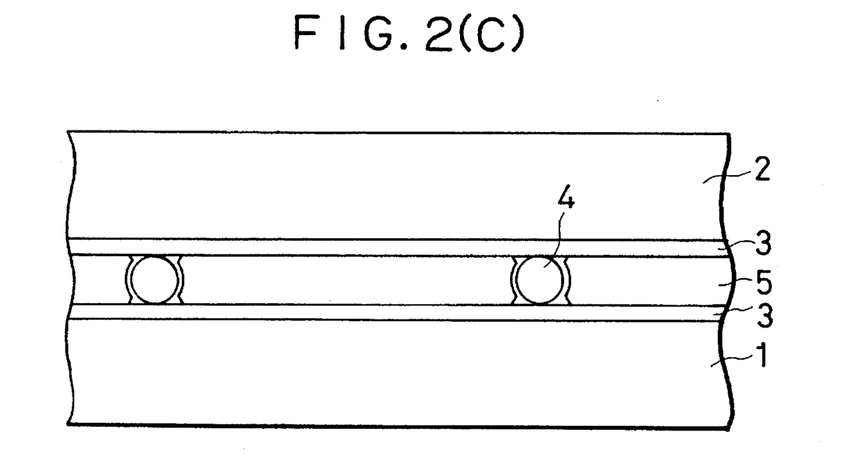

Referring to FIGS. 2(A) to 2(C), a process of fabricating a liquid crystal electrooptical device according to a fourth embodiment of the present invention is described below. The substrate used herein comprises a commonly used soda-lime glass plate 1 having provided thereon a 2000 Å thick ITO transparent electrode 3 in a predetermined pattern. Spacers 4 (10.5 μm in average diameter) were then sprayed by a wet method on the electrode side surface of the substrate. The spacer is a composite comprising a ball (a hard sphere core portion) and an organic matter coated thereon, and is dispersed in a mixed solvent of methanol and freon. The spacers having dispersed in the mixed solvent, as shown in FIG. 2(A), were subjected to heat treatment in the temperature range of from 150° C. to 200° C. (180° C. in the present example) for a duration of about 15 minutes thereby to remove the solvent and to melt the organic matter which had been present on the outer surface of the spacer at the same time. Thus were the spacers adhered and fixed on the surface of the substrate.

To the resulting surface of the substrate was applied a mixed aqueous solution of polyvinyl alcohol and a nematic liquid crystal using a spin coater, and was heated at 120° C. for 20 minutes to obtain from about 10 to 12 μm thick light-control layer 5 as shown in FIG. 2(B). The other substrate 2 was superposed on the substrate having provided thereon the light-control layer 5 at a predetermined arrangement, and a heat treatment at 120° C. for a duration of 30 minutes was effected while pressing the substrates under a pressure of from 1 to 5 kg/cm². Thus was completed a liquid crystal electrooptical device as shown in FIG. 2(C).

The resulting device comprised substrates at a uniform spacing, such as to give a distance between the substrates of 10.2 μm with a deviation within ±0.1 μm from this value, over substrates having an area of 200 mm×260 mm. Furthermore, the spacers were uniformly dispersed without causing segregation during the spin coating process at the fabrication of the light-control layer.

Alternatively, the substrates may be laminated, if necessary, in vacuum or under a reduced pressure. In such a case, the step of removing the solvent after the spin coating step may be omitted.

EXAMPLE 5

Referring again to FIGS. 2(A) to 2(C), a process of fabricating a liquid crystal electrooptical device according to a fifth embodiment of the present invention is described below. The substrate used herein comprises a commonly used soda-lime glass plate 1 having provided thereon a 2000 Å thick ITO transparent electrode 3 in a predetermined pattern. Spacers 4 (10.5 μm in average diameter) were then sprayed by a wet method on the electrode side surface of the substrate. The spacer was a composite comprising a hard sphere core portion and an organic outer surface covering thereof, and is dispersed in a mixed solvent of methanol and freon. The spacers having dispersed in the mixed solvent, as shown in FIG. 2(A), were subjected to heat treatment in the temperature range of from 150° C. to 200° C. (180° C. in the present example) for a duration of about 15 minutes thereby to remove the solvent and to melt the organic matter which had been present on the outer surface of the spacer at the same time. Thus were the spacers adhered and fixed on the surface of the substrate.

A homogeneously mixed solution comprising a prepolymer, e.g. monomers and a nematic liquid crystal was applied on the surface of the substrate having fixed thereon the spacers by screen printing to a thickness of about 15 μm.

A homogeneous solution was prepared by mixing trimethylolpropane-triacrylate, which is used as the pre-polymer herein, with a commonly known nematic liquid crystal material, together with a polymerization initiator at an addition of about 25% with respect to the liquid crystal material. After applying the resulting homogeneous solution to one of the substrates as shown in FIG. 2(B), the other substrate 2 was superposed thereon at a predetermined arrangement, and the resulting laminate was pressed under a pressure of from 1 to 5 kg/cm$^2$ to adjust the distance between the substrates to about 10 μm, and to drive out the homogeneous solution having incorporated in excess. After masking the portions other than portions of the substrates overlapping each other to avoid light irradiation thereto, a UV radiation was irradiated to the substrate to cure (polymerize) the pre-polymer maintained between the substrates to thereby establish a light-control layer while fixing the pair of substrates. The irradiation was carried out for a duration of about 5 minutes to the laminated substrates using a 100 W/cm UV lamp set at a distance of about 20 cm from the substrates. Then, the peripheral portions which remained un-irradiated with UV light were cleaned by removing the homogeneously mixed solution which had been driven out from the substrates using an organic solvent, to thereby fix the pair of substrates and finish it into a liquid crystal electrooptical device as shown in FIG. 2 (C).

Since the contact lead portion of the substrates can be cleaned at the same time with the removal of the excess amount of the homogeneously mixed solution which had been driven out from the substrates, a favorable connection with a driving electric circuit for the liquid crystal could be established in the subsequent step. Thus, a higher reliability of the device could be achieved.

Though the spacers mentioned hereinbefore are composite spacers, there may also be provided spacers only at desired portions of the substrate. That is, there may be alternatively employed a process which comprises coating the whole surface of the substrate with a photocurable organic material, and after irradiating only the desired portions with light while covering the undesired portions with a mask, developing the substrate to leave out the organic material at the desired portions.

EXAMPLE 6

Referring again to FIGS. 2(A) to 2(C), a process of fabricating a liquid crystal electrooptical device according to a sixth embodiment of the present invention is described below. The substrate used herein comprises a commonly used soda-lime glass plate 1 having provided thereon a 2000 Å thick ITO transparent electrode 3 in a predetermined pattern. Spacers 4 (10.5 μm in average diameter) were then sprayed by a wet method on the electrode side surface of the substrate. The spacer is a composite comprising a hard sphere core portion and an organic outer surface covering thereof, and is dispersed in a mixed solvent of methanol and freon. The spacers having dispersed in the mixed solvent, as shown in FIG. 2(A), were subjected to heat treatment in the temperature range of from 150° C. to 200° C. (180° C. in the present example) for a duration of about 15 minutes thereby to remove the solvent and to melt the organic matter which had been present on the outer surface of the spacer at the same time. Thus were the spacers adhered and fixed on the surface of the substrate.

A homogeneously mixed solution comprising a prepolymer, e.g. monomers, and a nematic liquid crystal was applied on the surface of the substrate having fixed thereon the spacers by screen printing to a thickness of about 15 μm.

A homogeneous solution was prepared by mixing trimethylolpropane-triacrylate, which is used as the pre-polymer herein, with a commonly known nematic liquid crystal material, together with a polymerization initiator at an addition of about 25% with respect to the liquid crystal material. After applying the resulting homogeneous solution to one of the substrates, the other substrate 2 was superposed thereon at a predetermined arrangement, and the resulting laminate was pressed under a pressure of from 1 to 5 kg/cm$^2$ to adjust the distance between the substrates to about 10 μm, and to drive out the homogeneous solution having incorporated in excess. The solution driven out from the substrates was wiped off, and to the whole area of the resulting structure was irradiated a ultraviolet (UV) radiation to cure (polymerize) the pre-polymer maintained between the substrates to thereby fix the substrates 1 and 2. The irradiation was carried out for a duration of about 5 minutes to the laminated substrates using a 100 W/cm UV lamp set at a distance of about 20 cm from the substrates. The light-control layer 5 comprising a transparent solid and a liquid crystal was established and the substrates were then fixed, to thereby obtain a liquid crystal electrooptical device as shown in FIG. 2(C).

The resulting device comprised substrates having each an area of 200 mm×260 mm at a uniform spacing therebetween, such as to give a distance between the substrates of 10.0 μm with a deviation within ±0.1 μm from this value over the whole area of the substrates. Furthermore, the spacers were properly dispersed without causing segregation during the screen printing process at the fabrication of the light-control layer.

The process described in this Example is advantageous for fabricating a large-area device, since no step of removing the solvent is required after coating the light-control layer. Further effective is to apply a heat treatment to the resulting structure during the polymerization of the monomers or in the subsequent step thereto, to thereby increase the adhesion strength.

EXAMPLE 7

Figure 3A:
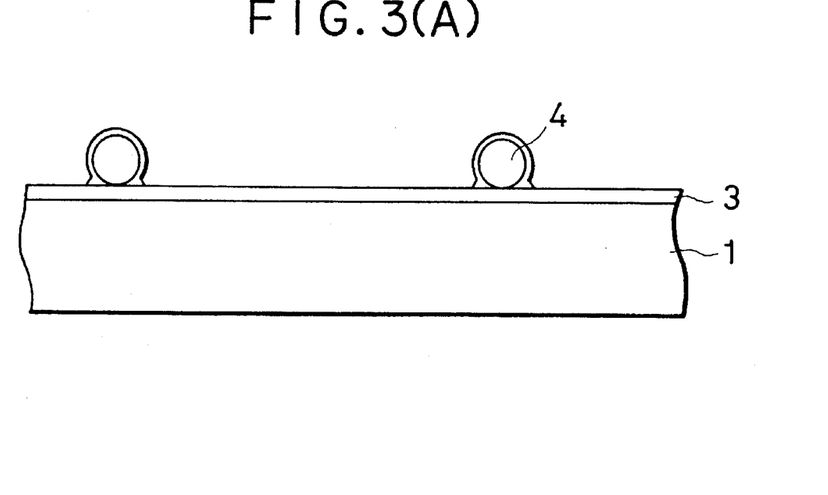
FIGS. 3(A) to 3(C) are cross sectional views illustrating a fabrication process of a liquid crystal electrooptical device according to an embodiment of the present invention.
Figure 3B:
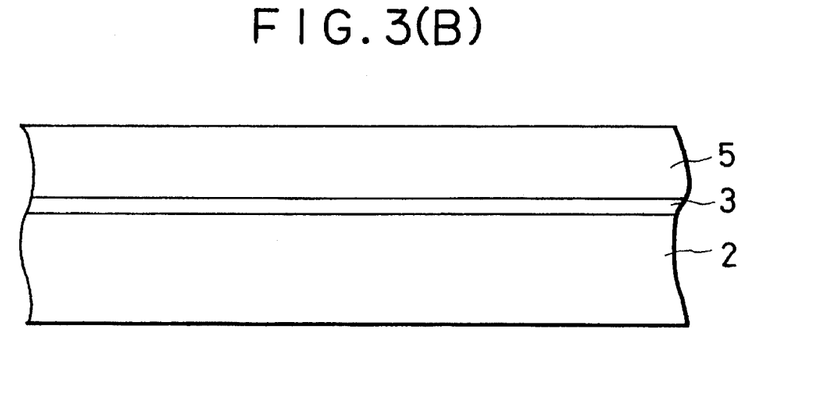
Figure 3C:
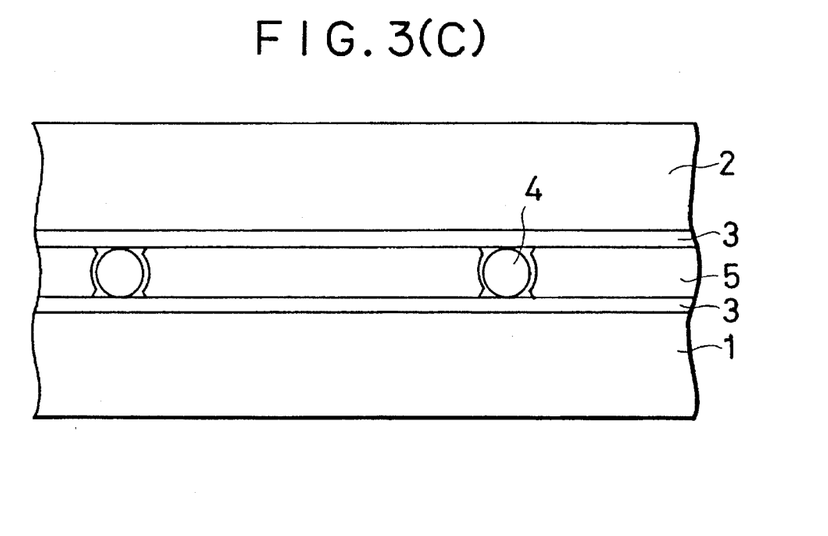

Referring to FIGS. 3(A) to 3(C), a process of fabricating a liquid crystal electrooptical device according to a seventh embodiment of the present invention is described below. Each of a pair of substrates used herein comprises a commonly used soda-lime glass plate 1 having provided thereon a 2000 Å thick ITO transparent electrode 3 in a predetermined pattern. Spacers 4 (10.5 μm in average diameter) were then sprayed by a wet method on the electrode side surface of one of the substrates. The spacer is a composite comprising a hard sphere core portion and an organic outer surface covering thereof, and is dispersed in a mixed solvent of methanol and freon. The spacers having dispersed in the mixed solvent, as shown in FIG. 3(A), were subjected to heat treatment in the temperature range of from 150° C. to 200° C. (180° C. in the present example) for a duration of about 15 minutes thereby to remove the solvent and to melt the organic matter which had been present on the outer surface of the spacer at the same time. Thus were the spacers adhered and fixed on the surface of the substrate.

To the electrode side surface of the other substrate 2 was applied a mixed aqueous solution of polyvinyl alcohol and a nematic liquid crystal using a spin coater, and was heated at 120° C. for 20 minutes to obtain from about 10 to 12 μm thick light-control layer 5 as shown in FIG. 3(B). The pair of substrates were superposed on each other at a predetermined arrangement, and a heat treatment at 120° C. for a duration of 30 minutes was effected while pressing the substrates under a pressure of from 1 to 5 kg/cm² to thereby fix the pair of substrates. Thus was completed a liquid crystal electrooptical device as shown in FIG. 3(C).

The resulting device comprised substrates at a uniform spacing, such as to give a distance between the substrates of 10.2 μm with a deviation within ±0.1 μm from this value, over substrates having an area of 200 mm×260 mm. Furthermore, the spacers were uniformly dispersed without causing segregation during the spin coating process at the fabrication of the light-control layer.

Alternatively, the substrates may be laminated, if necessary, in vacuum or under a reduced pressure. In such a case, the step of removing the solvent after the spin coating step may be omitted. Still more, the spacers which were fixed to the substrate in the present example not necessarily be fixed, and arranging them by dispersion is sufficiently effective.

EXAMPLE 8

Referring again to FIGS. 3(A) to 3(C), a process of fabricating a liquid crystal electrooptical device according to an eighth embodiment of the present invention is described below. Each of a pair of substrates used herein comprises a commonly used soda-lime glass plate 1 having provided thereon a 2000 Å thick ITO transparent electrode 3 in a predetermined pattern. Spacers 4 (10.5 μm in average diameter) were then sprayed by a wet method on the electrode side surface of one of the substrates. The spacer was a composite comprising a hard sphere core portion and an organic outer surface covering thereof, and is dispersed in a mixed solvent of methanol and freon. The spacers having dispersed in the mixed solvent, as shown in FIG. 3(A), were subjected to heat treatment in the temperature range of from 150° C. to 200° C. (180° C. in the present example) for a duration of about 15 minutes thereby to remove the solvent and to melt the organic matter which had been present on the outer surface of the spacer at the same time. Thus were the spacers adhered and fixed on the surface of the substrate.

A homogeneously mixed solution comprising a prepolymer, e.g. monomers, and a nematic liquid crystal was applied on the electrode side surface of the other substrate 2 by screen printing to a thickness of about 15 μm as shown in FIG. 3(B).

A homogeneous solution was prepared by mixing trimethylolpropane-triacrylate, which is used as the pre-polymer herein, with a commonly known nematic liquid crystal material, together with a polymerization initiator at an addition of about 25% with respect to the liquid crystal material. After applying the resulting homogeneous solution to the other substrate 2, the pair of substrates were superposed on each other at a predetermined arrangement as shown in FIG. 3(C), and the resulting laminate was pressed under a pressure of from 1 to 5 kg/cm² to adjust the distance between the substrates to about 10 μm, and to drive out the homogeneous solution having incorporated in excess. After masking the portions other than portions of the substrates overlapping each other to avoid light irradiation thereto, a UV radiation was irradiated to the substrate to cure (polymerize) the pre-polymer maintained between the substrates to thereby establish a light-control layer while fixing the pair of substrates. The irradiation was carried out for a duration of about 5 minutes to the laminated substrates using a 100 W/cm UV lamp set at a distance of about 20 cm from the substrates. Then, the peripheral portions which remained un-irradiated with UV light were cleaned by removing the homogeneously mixed solution which had been driven out from the substrates using an organic solvent, to thereby fix the pair of substrates and finish it into a liquid crystal electrooptical device as shown in FIG. 3 (C).

Since the contact lead portion of the substrates can be cleaned at the same time with the removal of the excess amount of the homogeneously mixed solution which had been driven out from the substrates, a favorable connection with a driving electric circuit for the liquid crystal could be established in the subsequent step. Thus, a higher reliability of the device could be achieved.

Though the spacers mentioned hereinbefore are composite spacers, there may also be provided spacers only at desired portions of the substrate. That is, there may be alternatively employed a process which comprises coating the whole surface of the substrate with a photocurable organic material, and after irradiating only the desired portions with light while covering the undesired portions with a mask, developing the substrate to leave out the organic material at the desired portions.

EXAMPLE 9

Figure 4A:
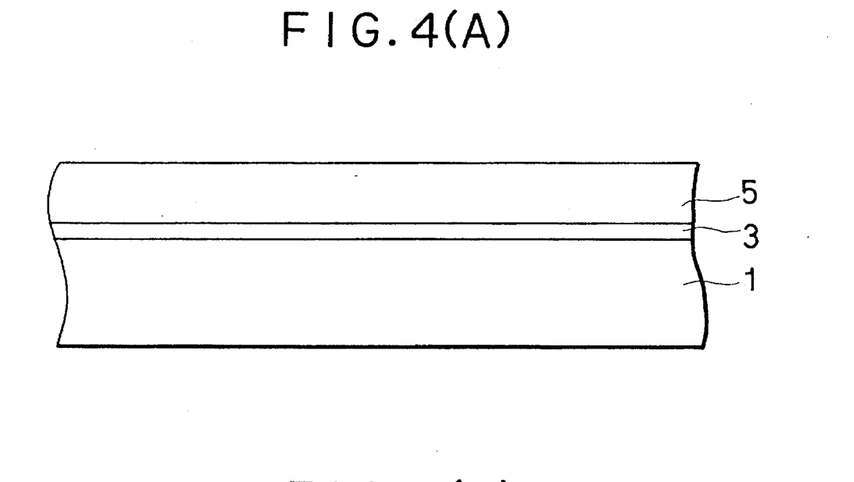
FIGS. 4(A) to 4(C) are cross sectional views illustrating a fabrication process of a liquid crystal electrooptical device according to an embodiment of the present invention.
Figure 4B:
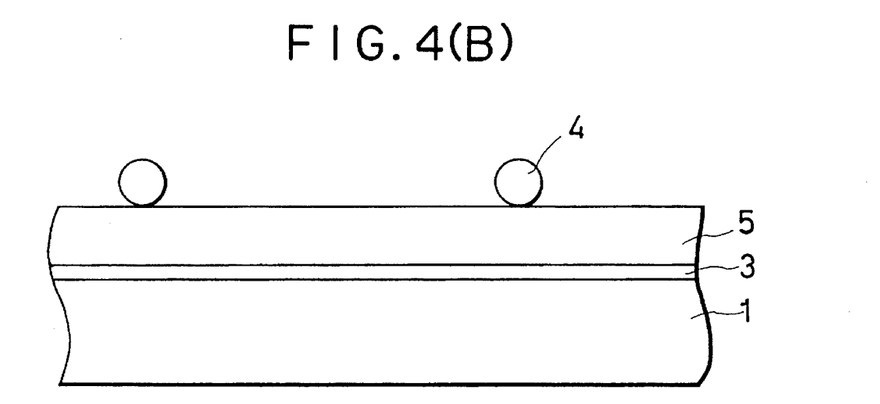
Figure 4C:
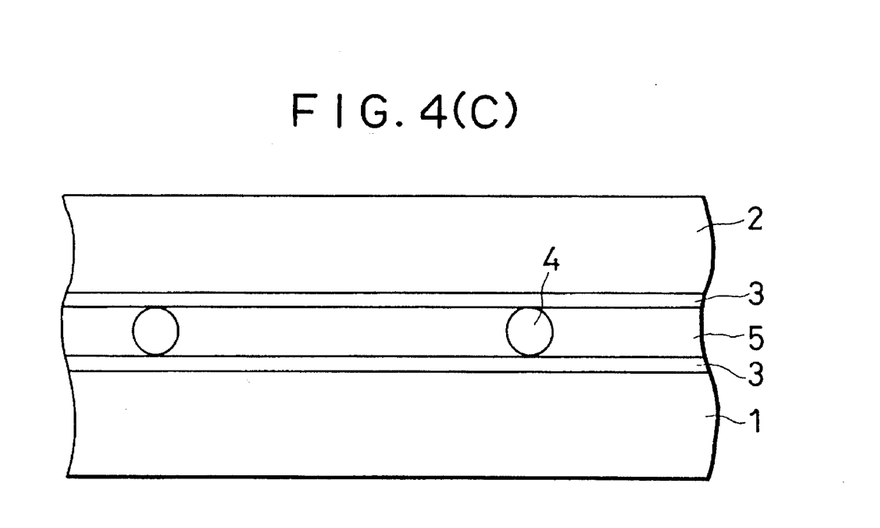

Referring to FIGS. 4(A) to 4(C), a process of fabricating a liquid crystal electrooptical device according to a ninth embodiment of the present invention is described below. The substrate used herein comprises a commonly used soda-lime glass plate 1 having provided thereon a 2000 Å thick ITO transparent electrode 3 in a predetermined pattern. The electrode side surface of the substrate was coated with a homogeneously mixed solution of a prepolymer and a nematic liquid crystal by screen printing to a thickness of about 15 μm, as shown in FIG. 4(A).

The homogeneously mixed solution was prepared by mixing trimethylolpropane-triacrylate, the pre-polymer herein, with a commonly known nematic liquid crystal material, together with a polymerization initiator at an addition of about 25% with respect to the liquid crystal material. To the coated surface obtained above were then dry-sprayed spacers 4 (10.5 μm in average diameter) to give a structure as shown in FIG. 4(B). The other substrate 2 was then superposed at a predetermined arrangement on the substrate having provided thereon the coating layer and the spacers as shown in FIG. 4(C), and the resulting laminate was pressed under a pressure of from 1 to 5 kg/cm² to adjust the spacing between the substrates to about 10 μm, while driving out the excess amount of the homogeneous solution. The unnecessary portion of the homogeneous solution driven out from the substrates was wiped off, and the prepolymer (monomer) remained between the substrates was cured (polymerized) by irradiating a UV light over the whole substrate to thereby fix the pair of substrates 1 and 2. The irradiation was conducted for a duration of about 5 minutes to the laminated substrates using a 100 W/cm UV lamp set at a distance of about 20 cm from the substrates. Thus was established the light-control layer 5 comprising a transparent solid and a liquid crystal while adhering the substrates, to result in a liquid crystal electrooptical device as shown in FIG. 4(C).

The resulting device comprised substrates having each an area of 200 mm×260 mm at a uniform spacing therebetween, such as to give a distance between the substrates of 10.0 μm with a deviation within ±0.1 μm from this value over the whole area of the substrates. Furthermore, the spacers were properly dispersed without causing segregation during the screen printing process at the fabrication of the light-control layer.

The process described in this Example is advantageous for fabricating a large-area device, since no step of removing the solvent is required after coating the light-control layer. Further effective is to apply a heat treatment to the resulting structure during the polymerization of the monomers or in the subsequent step thereto, to thereby increase the adhesion strength.

As shown in the foregoing examples, the present invention provides an economical process consisting of reduced number of steps, for fabricating large-scale dispersion-type liquid crystal electrooptical devices without causing segregation of spacers. Furthermore, since the resulting devices have evenly distributed spacers, uniform displays can be obtained. Thus, large-scaled liquid crystal electrooptical devices which can provide uniform displays are realized at an extremely few steps comprising coating once the substrate with a material for the light-control layer.

In the foregoing examples, other coating methods can be applied to the coating step of the light-control layer as well. In the practical application, the methods should be properly selected depending on the composition, viscosity, and properties of the solution.

While the invention has been described in detail and with reference to specific embodiments thereof, it will be apparent to one skilled in the art that various changes and modifications can be made therein without departing from the spirit and scope thereof.

What is claimed is:

1. A method for manufacturing a liquid crystal device comprising the steps of:

forming a mixture including spacers, a material comprising a liquid crystal material and a material for providing a transparent solid;

applying the mixture on a substrate;

joining said substrate with another substrate with said mixture therebetween after said applying step; and curing said material for providing the transparent solid while pressing said substrates toward one another.

2. The method of claim i further comprising the step of fixing the substrates to each other by treatment selected from the group consisting of light irradiation treatment, heating treatment and combination thereof.

3. The method of claim 1 wherein said material for providing a transparent solid comprises monomers to become a transparent solid polymer.

4. The method of claim 3 further comprising the steps of:

irradiating light on a portion of one of the substrates which overlaps the other one of the substrates after said joining step with portions of the substrates other than said portion masked to change said monomers into said transparent solid polymer; and removing a portion of said mixture in which said monomers are not changed into said transparent solid polymer by said irradiating step.

5. The method of claim i wherein said material for providing a transparent solid comprises a transparent solid polymer selected from the group consisting of polyethylene, polymethacrylate, polystyrene, polyvinyl chloride, polyacrylonitrile, polyvinyl alcohol, polyester, polyamide resin, polyethylene terephthalate, fluoroplastics, and silicone resin.

6. The method of claim 1 wherein said spacers comprise balls and organic matter coated on said balls.

7. The method of claim 1 wherein said substrates are pressed towards one another under a pressure of from 1 to 5 kg/cm².

8. A method for manufacturing a liquid crystal device comprising the steps of:

dispersing spacers on a substrate;

fixing the dispersed spacers on said substrate;

forming a mixture including a liquid crystal material and a material for providing a transparent solid;

applying said mixture to said substrate after said fixing step to form a liquid crystal layer on said substrate;

joining said substrate with another substrate with said liquid crystal layer and said spacers therebetween after said forming step; and curing said material for providing the transparent solid while pressing said substrates toward one another.

9. The method of claim 8 further comprising the step of fixing the substrates to each other by treatment selected from the group consisting of light irradiation treatment, heating treatment and combination thereof.

10. The method of claim 8 wherein said material for providing a transparent solid comprises monomers to become a transparent solid polymer.

11. The method of claim 10 further comprising the steps of:

irradiating light on a portion of one of the substrates which overlaps the other one of the substrates after said joining step with portions of the substrates other than said portion masked to change said monomers into said transparent solid polymer; and removing a portion of said liquid crystal layer in which said monomers are not changed into said transparent solid polymer by said irradiating step.

12. The method of claim 7 wherein said material for providing a transparent solid comprises a transparent solid polymer selected from the group consisting of polyethylene, polymethacrylate, polystyrene, polyvinyl chloride, polyacrylonitrile, polyvinyl alcohol, polyester, polyamide resin, polyethylene terephthalate, fluoroplastics, and silicone resin.

13. The method of claim 8 wherein said spacers comprise balls and organic matters coated on said balls.

14. The method of claim 8 wherein said substrates are pressed towards one another under a pressure of from 1 to 5 kg/cm².

15. A method for manufacturing a liquid crystal device comprising the steps of:

dispersing spacers on a substrate;

forming a mixture including a liquid crystal material and a material for providing a transparent solid;

applying said mixture to another substrate to form a liquid crystal layer on said another substrate;

joining the substrates with each other with said liquid crystal layer and said spacers therebetween after said forming step and said dispersing step; and curing said material for providing the transparent solid while pressing said substrates toward one another.

16. The method of claim 15 further comprising the step of fixing the substrates to each other by treatment selected from the group consisting of light irradiation treatment, heating treatment and combination thereof.

17. The method of claim 15 wherein said material for providing a transparent solid comprises monomers to become a transparent solid polymer.

18. The method of claim 17 further comprising the steps of:

irradiating light on a portion of one of the substrates which overlaps the other one of the substrates after said joining step with portions of the substrates other than said portion masked to change said monomers into said transparent solid polymer; and removing a portion of said liquid crystal layer in which said monomers are not changed into said transparent solid polymer by said irradiating step.

19. The method of claim 15 wherein said material for providing a transparent solid comprises a transparent solid polymer selected from the group consisting of polyethylene, polymethacrylate, polystyrene, polyvinyl chloride, polyacrylonitrile, polyvinyl alcohol, polyester, polyamide resin, polyethylene terephthalate, fluoroplastics, and silicone resin.

20. The method of claim 15 wherein said spacers comprise balls and organic matters coated on said balls.

21. The method of claim 15 wherein said substrates are pressed towards one another under a pressure of from 1 to 5 kg/cm$^2$.

22. A method for manufacturing a liquid crystal device comprising the steps of:

forming a mixture including a liquid crystal material and a material for providing a transparent solid;

applying said mixture to a substrate to form crystal layer on said substrate;

dispersing spacers on said liquid crystal layer;

joining said substrate with another substrate with said liquid crystal layer and said spacers therebetween after said dispersing step; and curing said material for providing the transparent solid while pressing said substrates toward one another.

23. The method of claim 22 wherein said material for providing a transparent solid comprises a transparent solid polymer selected from the group consisting of polyethylene, polymethacrylate, polystyrene, polyvinyl chloride, polyacrylonitrile, polyvinyl alcohol, polyester, polyamide resin, polyethylene terephthalate, fluoroplastics, and silicone resin.

24. The method of claim 22 wherein said substrates are pressed towards one another under a pressure of from 1 to 5 kg/cm$^2$.

* * * * *